United States Patent [19]
Kojima

[11] Patent Number: 5,177,603
[45] Date of Patent: Jan. 5, 1993

[54] IMAGE COPYING APPARATUS HAVING MEANS FOR DELETING COLOR PORTIONS OF AN ORIGINAL IMAGE

[75] Inventor: Akio Kojima, Hirakata, Japan

[73] Assignee: Matsushita Electric Industrial Co., Ltd., Osaka, Japan

[21] Appl. No.: 693,456

[22] Filed: Apr. 29, 1991

[30] Foreign Application Priority Data

Apr. 27, 1990 [JP] Japan .................. 2-113377
Jun. 18, 1990 [JP] Japan .................. 2-159025

[51] Int. Cl.⁵ .......................................... H04N 1/46
[52] U.S. Cl. ..................... 358/80; 358/453; 358/75
[58] Field of Search ............. 382/17; 358/453, 75, 358/448, 467, 80

[56] References Cited

U.S. PATENT DOCUMENTS

| | | | |
|---|---|---|---|
| 4,538,182 | 8/1985 | Saito et al. | 358/453 |
| 4,739,397 | 4/1988 | Hayashi | 358/75 |
| 4,829,371 | 5/1989 | Hiramatsu et al. | 358/75 |
| 4,893,179 | 1/1990 | Ito | 358/79 |
| 5,028,991 | 7/1991 | Sekizawa et al. | 358/75 |
| 5,032,904 | 7/1991 | Murai et al. | 355/327 |

FOREIGN PATENT DOCUMENTS

0363146A2  3/1989  European Pat. Off.
62-131667   6/1987  Japan.
62-192862   8/1987  Japan.

Primary Examiner—Edward L. Coles, Sr.
Assistant Examiner—Jill Jackson
Attorney, Agent, or Firm—Wenderoth, Lind & Ponack

[57] ABSTRACT

A color deleting apparatus includes an image reading device for reading a color original document and for producing R, G, B signals for each pixel, a monochrome generator for producing a gradation image signal based on the R, G, B signal, a color judging circuit for judging whether the R, G, B signal is carrying chromatic information or achromatic information, and a deleting circuit for deleting the gradation image signal when the color judging circuit judges that the R, G, B signal is carrying chromatic information. Thus, the colored areas in the color original document are completely deleted in the copied image.

4 Claims, 5 Drawing Sheets

IMAGE COPYING APPARATUS HAVING MEANS FOR DELETING COLOR PORTIONS OF AN ORIGINAL IMAGE

BACKGROUND OF THE INVENTION

1. Field of the Invention

The present invention relates to a color deleting apparatus for use in a digital color copying machine, a color facsimile machine, or the like, to delete color markings from an original document.

2. Description of the Prior Art

Recent digital color copying machines are equipped with various editing functions in addition to the original copying function to reproduce an original color document with high precision. One editing function is, for example, to color the original document copied by a conventional monochrome copying machine, or to change a specific color of the original document to a different color.

In addition to the above, there is a desire to change a copy from a color marked document to a non-color marked document. In other words, there is a desire to provide such a copying machine that when a document with color markings or with color stamps is set, a copied document with no color markings or no color stamps is reproduced. Such a color deleting function is desired to be added to the conventional copying machines so as to easily delete the chromatic area of the document except for the achromatic area.

The conventional copying machines have not been provided with the above-noted color deleting function by simply deleting the chromatic area from the document, but instead, the color deleting function is achieved by the use of the aforementioned color changing function, as explained below.

Figure 8:
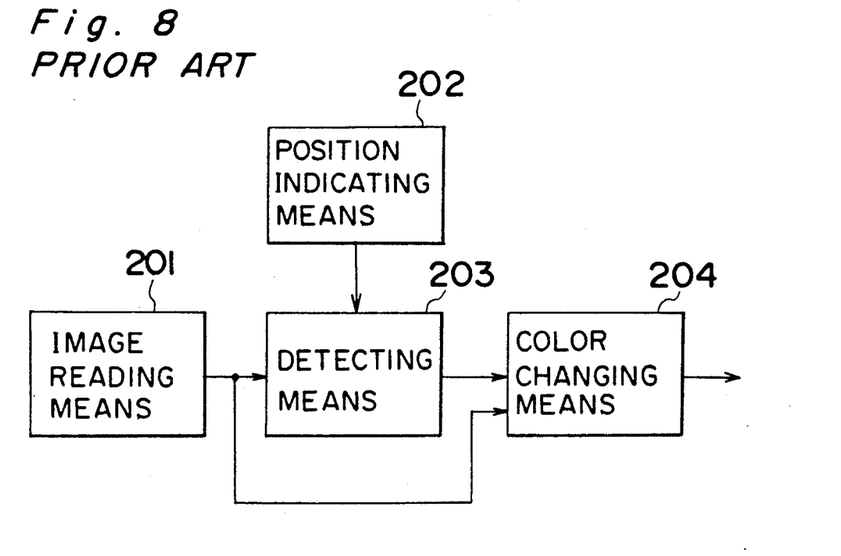
FIG. 8 is a block diagram of a color image processing apparatus according to the prior art.

In FIG. 8, a block diagram of a prior art color image processing apparatus is shown, wherein reference numbers 201, 202, 203 and 204 represent an image reading means, a position indicating means, a detecting means and a color changing means, respectively.

The conventional color image processing apparatus shown in FIG. 8 operates in the following manner.

The image reading means 201 reads a color image of the original document using an image sensor such as a CCD (charge-coupled device), and outputs color data of decomposed three colors (digital data). The position indicating means 202 which is comprised of a digitizer and the like can input the positional data of a pixel at one arbitrary point by designating the one point within the area having an approximately constant density of the color image. The detecting means 203 detects the maximum and minimum values of the density of N×N pixels in the periphery of the pixel designated by the position indicating means 202 in the color data of three colors. The color changing means 204 compares the maximum and minimum values detected by the detecting means 203 with the color data of three colors supplied from the image reading means 201, thereby determining whether the pixel is within the area of the designated density, and changing the color of the area to a different color depending on the determining result. Accordingly, in the prior art color image processing apparatus, a color is deleted by indicating the color that is desired to be deleted from the original document and changing it to white. Such a copying machine is disclosed, for example, in Japanese Patent Laid-Open Publication 62-192862. Other prior art copying machines are disclosed in Japanese Patent Laid-Open Publication 62-131667 and in European Patent Publication EP 0,363,146 A2.

According to the aforementioned method, however, if a plurality of colors are desired to be deleted, the designation of the color should be repeatedly carried out one by one.

Moreover, only the color within the designated range of density which is between the maximum and minimum detected density can be deleted in the aforementioned method, and the color beyond the designated range cannot be deleted.

Furthermore, when the color copying machine is of a type which carries out four sequential copying operations of yellow, cyan, magenta and black images, the forming of a monochromatic copy takes a relatively long time.

SUMMARY OF THE INVENTION

An object of the present invention is to provide a color deleting apparatus capable of deleting color with a high accuracy and at a high speed through simple designation of a chromatic area except for an achromatic area of a color original document.

In accomplishing the above-described object, the color deleting apparatus according to a first embodiment of the present invention comprises an image reading means for decomposing a color original document to a plurality of colors and for producing a color image data for each pixel; a monochrome generating means for producing a monochrome image data from said color image data; a color judging means for judging whether said color image data is carrying chromatic information or achromatic information; and a deleting means for deleting said monochrome image data when said color judging means judges that the color image data is carrying chromatic information.

According to a second embodiment of the present invention, a color deleting apparatus comprises: an image reading means for decomposing a color original document to a plurality of colors and for producing a color image data for each pixel; an image processing means for producing yellow, magenta, cyan and black data from said color image data for each pixel; a color judging means for judging whether said color image data is carrying chromatic information or achromatic information; and a deleting means for deleting said yellow, magenta, cyan and black data when said color judging means judges that the color image data is carrying chromatic information.

According to a third embodiment of the present invention, a color deleting apparatus comprises: an image reading means for decomposing a color original document to a plurality of colors and for producing a color image data for each pixel; a monochrome generating means for producing a monochrome image data from said color image data; an image processing means for producing yellow, magenta, cyan and black data from said color image data for each pixel; a selecting means for selecting either one of said monochrome image data and said yellow, magenta, cyan and black data; a color judging means for judging whether said color image data is carrying chromatic information or achromatic information; and a deleting means for deleting said selected data when said color judging means judges that the color image data is carrying chromatic information.

Since the color is deleted based on the judgement whether the color data is carrying chromatic or achromatic information, which is different from the conventional deleting method, the color is deleted through detection of the color area of a specific density. Thus, the deleting accuracy is enhanced.

In addition to the above-noted improvement of the deleting accuracy, the copying speed is increased since it is not necessary to perform pre-scanning to find the color area of a specific density at a predetermined position.

In other words, in the case of the copying operation under the color mode, the image scanning is carried out four times sequentially to obtain a color copy even when the color copy includes only black-and-white colors. However, according to the present invention, in the case of printing only the black-and-white copy, the monochrome image data obtained by one image scanning is used. Therefore, it becomes possible to make a copy in a very short time.

If the present apparatus is connected to a color facsimile or the like, the color of the colored original document can be deleted through one reading operation, so that the transmission is completed by one transferring operation of the image data of one color, thus achieving high-speed transmission of the image data.

Further, the deleting area indicating means makes a judging signal of the color judging means effective to a desired area on the color original document, and selects the monochrome image data within the designated deleting area. Therefore, the image data which is turned monochromic can be used within the designated area. Moreover, the deleting area indicating means takes only the achromatic area detected by the color judging means as a valid data and, deletes the data except the valid data, making it possible for the user to delete the chromatic color in the desired color deleting area with good accuracy, and color the deleted area again with yellow, magenta, cyan, black, red, blue or green colors as desired.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE PREFERRED EMBODIMENTS

Before the description of the present invention proceeds, it is to be noted here that like parts are designated by like reference numerals throughout the accompanying drawings.

Figure 1A:
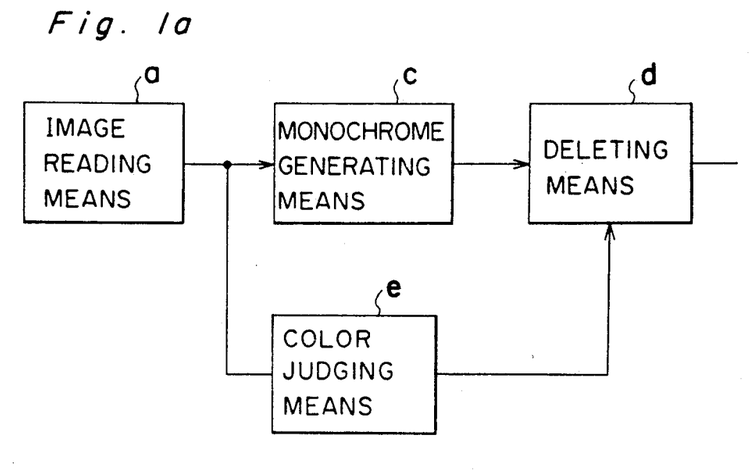
FIG. 1a is a block diagram of a color deleting apparatus according to a first embodiment of the present invention.

Referring to FIG. 1a, a color deleting apparatus according to a first preferred embodiment of the present invention is shown, in which reference character (a) designates an image reading means which reads a color image of an original document using an image sensor such as a charge-coupled device or the like and outputs a color data (digital data) of decomposed three colors for each pixel. Reference character (c) represents a monochrome generating means for receiving the color image from the image reading means and for forming a monochrome data as in a black and white picture for each pixel. Reference character (e) is a color judging means for judging for each pixel whether the color data from the image reading means is carrying a chromatic information or an achromatic information. In other words, when the color data is carrying a chromatic information, the color at that pixel position is other than black, gray or white. On the other hand, when the color data is carrying an achromatic information, the color at that pixel position is black, gray or white color. A reference character (d) is a deleting means or a gate means which permits the transmission of the monochrome data of a pixel when the color data is judged as carrying the achromatic information, and prevents the transmission of the monochrome data of a pixel when the color data is judged as carrying the chromatic information.

Figure 3A:
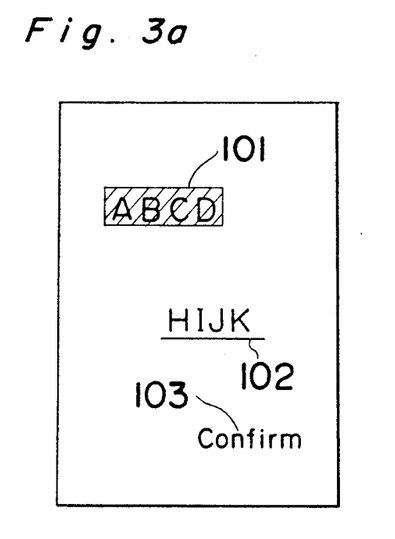
FIGS. 3a and 3b are explanatory views showing an example of the original document.
Figure 3B:
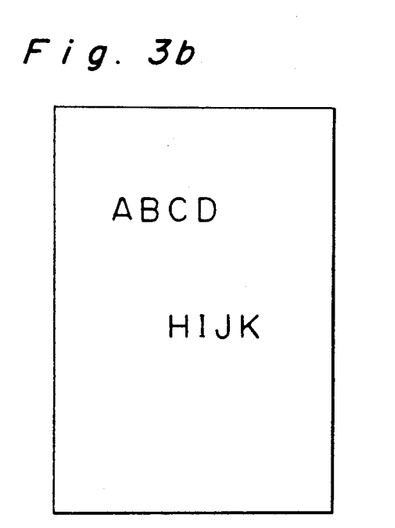

In the operation of the first embodiment, it is assumed that an original document such as shown in FIG. 3a is used, which has a black character string ABCD in a green highlight area 101 marked by a marking pen, a black character string HIJK over a red underline 102, and a blue stamp 103 which reads Confirm. By the image reading means (a), the original document is read from top to bottom and the color pixel data is sequentially read out. The color pixel data is converted to monochrome data in the monochrome generating means (c), and at the same time, the same is judged whether it is carrying chromatic information or achromatic information. When it is judged that the color pixel data is carrying the achromatic information, meaning that the color pixel data is either black, white or gray, the monochrome data from the monochrome generating means (c) is transmitted through the deleting means (d). On the other hand, when it is judged that the color pixel data is carrying the chromatic information, meaning that the color pixel data is other than black, gray and white, the monochrome data from the monochrome generating means (c) is cut at the deleting means (d). Then, the data produced from the deleting means (d) is applied to a black-and-white printer which prints only the black, white or gray images of the original document. Thus, the copied document would be as shown in FIG. 3b in which the green highlight 101, red underline 102 and blue Confirm stamp 103 are delete, and only the black letters are reproduced. In the first embodiment, although a black-and-white printer is used, it is possible to use a color printer under a black-and-white mode.

Figure 1B:
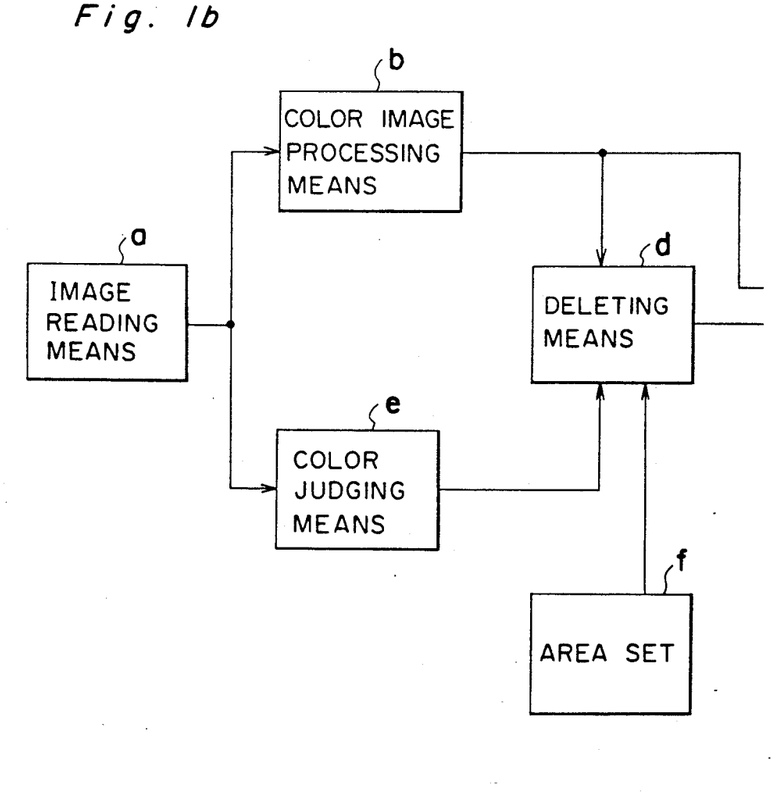
FIG. 1b is a block diagram of a color deleting apparatus according to a second embodiment of the present invention.

Referring to FIG. 1b, a color deleting apparatus according to a second preferred embodiment of the present invention is shown. When compared with the first embodiment, the second embodiment further has a color image processing means (b) inserted between the image reading means (a) and the deleting means (d), and the monochrome generating means (c) is removed. Also, an area setting means (f) may be further provided which is coupled to the deleting means (d). The color image processing means (b) receives color data from the image reading means (a) and forms yellow, cyan, magenta and black colors data for each pixel for setting an amount of color toner necessary at each pixel. The area setting means sets an area within the original document, and enables the deleting means (d) during the printing in the set area. During printing outside the set area, the deleting means is disabled.

Figure 4A:
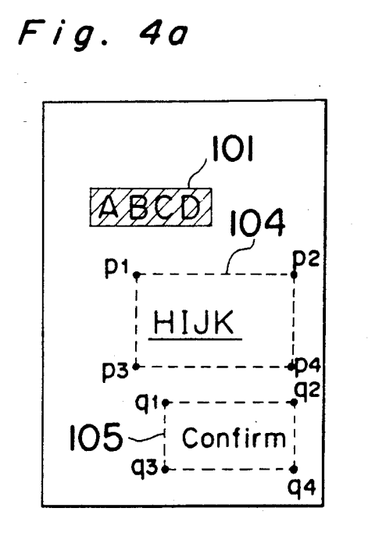
FIGS. 4a and 4b are views similar to FIGS. 3a and 3b, but particularly showing designated areas.

In operation of the second embodiment, it is assumed that the same original document is used, but this time two areas 104 (p1, p2, p3, p4) and 105 (q1, q2, q3, q4) are set by the area setting means (f), as shown in FIG. 4a. By the image reading means (a), the original document is read from top to bottom and the color pixel data is sequentially read out. In the second embodiment, the printer is a color printer.

Figure 2:
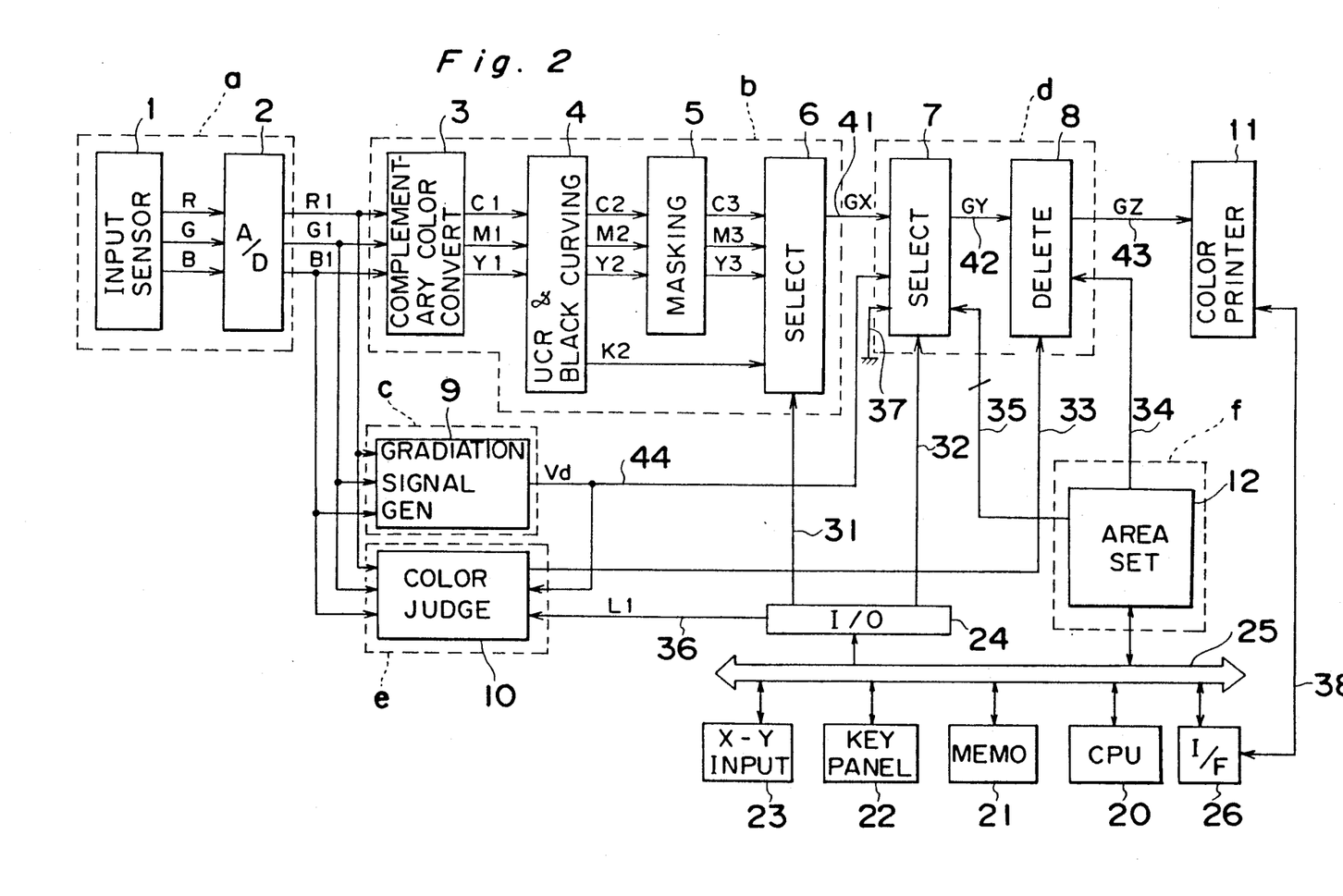
FIG. 2 is a block diagram of a color deleting apparatus according to a third embodiment of the present invention.

During the processing of the pixels outside the set areas 104 and 105, the deleting means (d) is disabled by a signal on a line 34 (FIG. 2). Thus, for the areas outside the areas 104 and 105, the yellow, cyan, magenta and black colors data are transmitted through the deleting means (d) without any change even when the color judging means (e) judges that the color pixel data is carrying the chromatic information.

However during the processing of the pixels within the set areas 104 and 105, the deleting means (d) is enabled by a signal on the line 34 and, also, the color pixel data is processed in the color image processing means (b) to produce yellow, cyan, magenta and black color data for each pixel, and at the same time, the same is judged whether it is carrying chromatic information or achromatic information. When it is judged that the color pixel data is carrying the achromatic information, meaning that the color pixel data is either black, white or gray, the yellow, cyan, magenta and black colors data from the color image processing means (b) are transmitted through the deleting means (d). On the other hand, when it is judged that the color pixel data is carrying the chromatic information, meaning that the color pixel data is other than black, gray and white, the yellow, cyan, magenta and black colors data are cut at the deleting means (d).

Figure 4B:
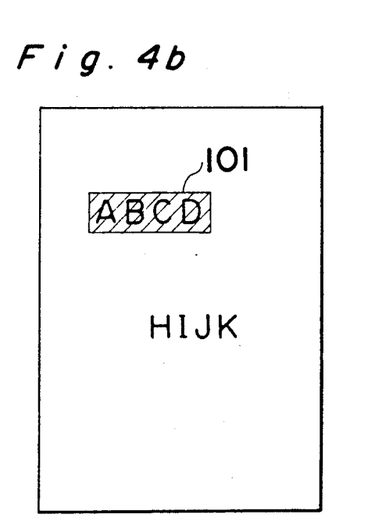

Thus, the copied document would be as shown in FIG. 4b in which the green highlight 101 remains, as well as the black letters, but the red underline 102 and blue Confirm stamp 103 are deleted.

Referring to FIG. 2, a detailed block diagram of a third embodiment of the color deleting apparatus is shown, which is a combination of the first and second embodiments, and includes additional functions to operate under three different modes.

The image reading means (a) is formed by an input sensor 1 and an analog-to-digital converter 2. The input sensor 1 is formed by a photoelectric converting element such as a CCD used in a camera or the like, and has red, blue and green color decomposing filters applied thereon. The light projected from a light source and reflected from a color original document is captured by the input sensor 1 which thereupon produces analog signals of three colors, namely, color separated signals R, G and B. The A/D converter 2 changes the analog signals to 8-bit digital signals R1, G1 and B1, thereby expressing 256 gradations for each color.

The color image processing means (b) is formed by a complementary color converter 3, a UCR/black curving circuit 4, a masking circuit 5 and a selector 6. The complementary color converter 3 changes the density of the outputs of the A/D converter 2, thereby obtaining complementary color signals Y1, M1 and C1 indicating the light exposure amount for forming the yellow, magenta and cyan images, respectively.

Figure 5:
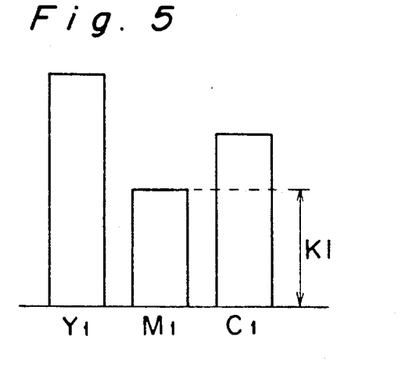
FIGS. 5, 6a and 6b are graphs showing color signal components.

The UCR/black curving circuit 4 conducts under-color removal and black curving with respect to the signals C1, M1 and Y1, and produces a modified signals Y2, M2 and C2 and also a black curving signal K2. In other words, an equation (1) below is operated by the circuit 4;

$$K1 = \min(Y1, M1, C1), \qquad (1)$$

in which K1 is the smallest of Y1, M1 and C1, as graphically shown in FIG. 5. Then, the circuit 4 operates an equation (2) below to obtain the modified signals Y2, M2 and C2 and the black curving signal K2;

$$Y2 = Y1 - (\alpha \times K1 - \beta)$$
$$M2 = M1 - (\alpha \times K1 - \beta)$$
$$C2 = C1 - (\alpha \times K1 - \beta)$$
$$K2 = \alpha K1 - \beta. \qquad (2)$$

In the above equation (2), $\alpha$ and $\beta$ are constant. When $\alpha = 1$ and $\beta = 0$, gray components are subjected 100% to under color removal, as in the full black method.

The masking circuit 5 performs color correction, that is to remove muddiness of the color decomposing filters of the input sensor 1 or muddiness of the toner of a color printer 11, and produces color corrected signals Y3, M3 and C3 based on an equation (3) below;

$$Y3 = a11 \cdot Y2 + a21 \cdot M2 + a31 \cdot C2$$
$$M3 = a12 \cdot Y2 + a22 \cdot M2 + a32 \cdot C2$$
$$C3 = a13 \cdot Y2 + a23 \cdot M2 + a33 \cdot C2 \qquad (3)$$

wherein $\alpha, \beta$ and $a11-a33$ are experimental parameters. Thus, signals Y3, M3, C3 and K2 indicate light exposure amounts for forming yellow, magenta, cyan and black images, respectively, on a photosensitive drum surface of the printer.

The selector 6 sequentially selects signals Y3, M3 and C3 and signal K2 for forming a color image on the photosensitive surface, in accordance with a set signal 31 from a CPU 20.

Thus, for forming a color copy, an original document is scanned four times. In response to the first scanning, selector 6 selects only signal Y3 for forming one entire yellow toner image on the drum surface of the printer 11. Then, in response to the second scanning, selector 6 selects only signal M3 for forming one entire magenta toner image on the drum surface of printer 11 overlapping the yellow toner image. Then, in response to the third scanning, selector 6 selects only signal C3 for forming one entire cyan toner image on the drum surface overlapping the yellow and magenta images. Finally, in response to the fourth scanning, selector 6 selects only signal K2 for adding black to the so far formed image, thus completing a copy.

The monochrome generating means (c) is formed by a gradation signal generator 9 which calculates a luminance signal V based on the signals R1, G1, B1 and outputs the gradation signal 44 (Vd) for the luminance signal V after converting the density. The luminance signal V and gradation signal 44 (Vd) are calculated by the following equation (4);

$$V = 0.30 \times R1 + 0.59 \times G1 + 0.11 \times B1$$

$$Vd = -\log(V). \quad (4)$$

The signal Vd is larger as it becomes more dark.

The deleting means (d) is formed by a selector 7 and a deleting circuit 8. The selector 7 selects, in accordance with a set signal 32 from the CPU 20 and a control signal 35 from an area setting circuit 12, either an output data 41 (GX) from the selector 6 or a gradation signal 44(Vd) from the gradation signal generating circuit 9 or a zero data 37.

Figure 7A:
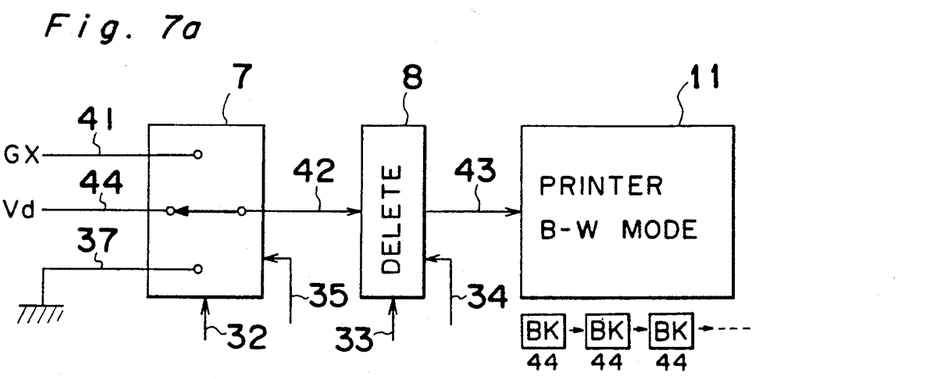
FIGS. 7a, 7b, and 7c are block diagram showing a portion of the circuit shown in FIG. 2 under three different modes, respectively.

When the circuit of FIG. 2 is set to a first copying mode, the selector 7 selects the gradation signal 44, as shown in FIG. 7a. Therefore, the monochrome generating means (c) is connected between the means (a) and (d), as in the arrangement of the first embodiment shown in FIG. 1a. In this case, the printer 11 is set to the black-and-white mode so that the copying operation is carried out only by the black exposure BK, as diagrammatically shown under the box 11 in FIG. 7a. Thus, the printed copy under the first copying mode would be as shown in FIG. 3b.

Figure 7B:
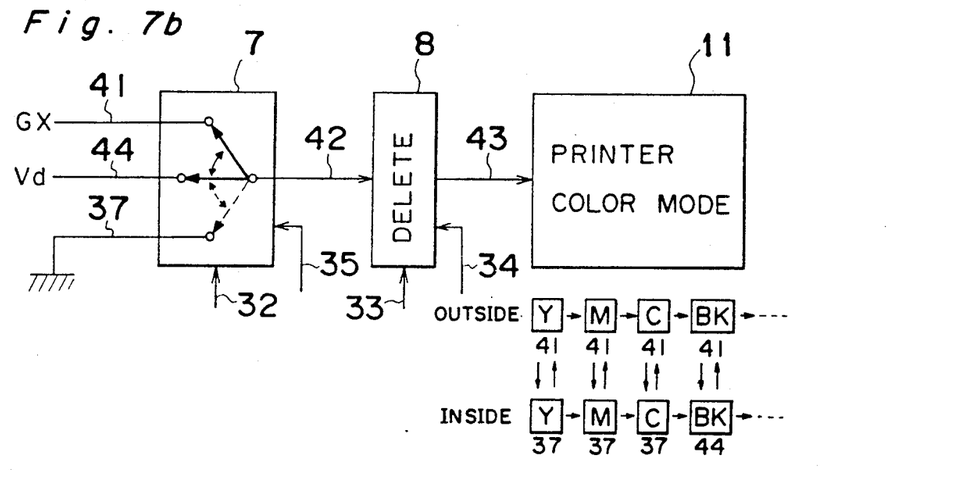

When the circuit of FIG. 2 is set to a second copying mode with the areas 104 and 105 blocked, the printer 11 is set in the color mode, and therefore, the coping operation for obtaining one color copy is carried out sequentially by yellow Y image forming, magenta M image forming, cyan C image forming, and black BK image forming, as diagrammatically shown under the box 11 in FIG. 7b through four image scanning operations.

In response to the first scanning, selector 6 selects signal Y3 and, during the printing of the areas outside the blocked areas 104 and 105, the selector 7 selects output data 41 (GX) which is now equal to signal Y3. Then, during the printing of the areas inside the blocked areas 104 and 105, the selector 7 selects the zero level signal 37. Thus, an yellow image with the blocked areas 104 and 105 blanked is formed.

Then, in response to the second scanning, selector 6 selects signal M3 and, during the printing of the areas outside the blocked areas 104 and 105, the selector 7 selects output data 41 (GX) which is now equal to signal M3. Then, during the printing of the areas inside the blocked areas 104 and 105, the selector 7 selects the zero level signal 37. Thus, a magenta image with the blocked areas 104 nd 105 blanked is formed over the yellow image.

Then, in response to the third scanning, selector 6 selects signal C3 and, during the printing of the areas outside the blocked areas 104 and 105, the selector 7 selects output data 41 (GX) which is now equal to signal C3. Then, during the printing of the areas inside the blocked areas 104 and 105, the selector 7 selects the zero level signal 37. Thus, a cyan image with the blocked areas 104 and 105 blanked is formed over the magenta image.

Then, in response to the fourth scanning, selector 6 selects signal K2 and, during the printing of the areas outside the blocked areas 104 and 105, the selector 7 selects output data 41 (GX) which is now equal to signal K2. Then, during the printing of the areas inside the blocked areas 104 and 105, the selector 7 selects the gradation signal 44(Vd). Thus, a black image both inside and outside the blocked areas 104 and 105 is formed over the cyan image. Accordingly a color copy with black-and-white inside the blocks is formed. Thus, the printed color copy under the second copying mode would be as shown in FIG. 4b.

Figure 7C:
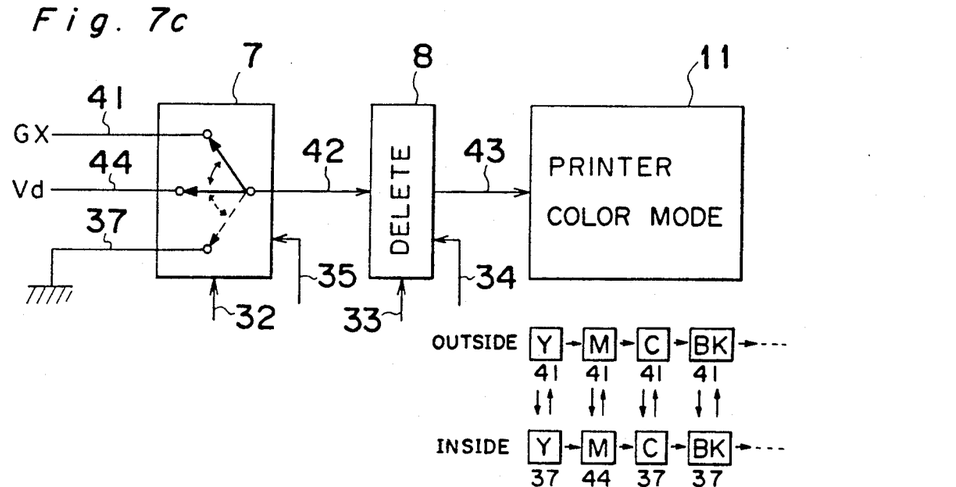

When the circuit of FIG. 2 is set to a third copying mode with the areas 104 and 105 blocked, the printer 11 is set in the color mode, and therefore, the coping operation for obtaining one color copy is carried out sequentially by yellow Y image forming, magenta M image forming, cyan C image forming, and black BK image forming, as diagrammatically shown under the box 11 in FIG. 7c through four image scanning operations.

Furthermore, under the third copying mode, an emphasizing color is selected through the key operation. For example, it is assumed that the color magenta is selected as an emphasizing color through key panel 22.

In response to the first scanning, an yellow image with the blocked areas 104 and 105 blanked is formed in the same manner as described above under the second copying mode.

Then, in response to the second scanning, selector 6 selects signal M3 and, during the printing of the areas outside the blocked areas 104 and 105, the selector 7 selects output data 41 (GX) which is now equal to signal M3. Then, during the printing of the areas inside the blocked areas 104 and 105, the selector 7 selects the gradation signal 44(Vd). Thus, a magenta image both inside and outside the blocked areas 104 and 105 is formed over the yellow image.

Then, in response to the third scanning, a cyan image with the blocked areas 104 and 105 blanked is formed over the magenta image, in the same manner as described above under the second copying mode.

Then, in response to the fourth scanning, selector 6 selects signal K2 and, during the printing of the areas outside the blocked areas 104 and 105, the selector 7 selects output data 41 (GX) which is now equal to signal K2. Then, during the printing of the areas inside the blocked areas 104 and 105, the selector 7 selects the zero level signal 37. Thus, a black image with the blocked areas 104 and 105 blanked is formed. Thus, the printed copy under the third copying mode would be similar to that shown in FIG. 4b, but the black-and-white images, e.g., "HIJK", within the blocked area is changed to the designated emphasizing color, i.e., magenta in the above described example.

In the third embodiment, when the area setting circuit 12 is operated to set at least one blocked area, the deleting circuit 8 is enabled only within the blocked area, and is disabled outside the blocked area in accordance with the control signal obtained along line 34.

Figure 6A:
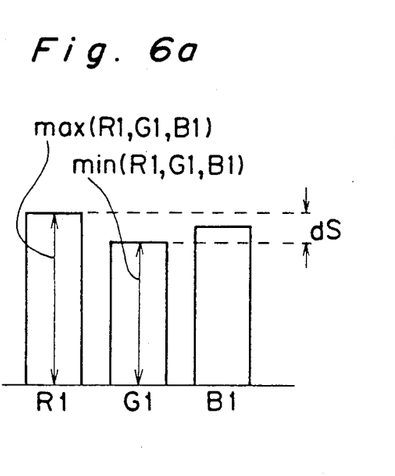
Figure 6B:
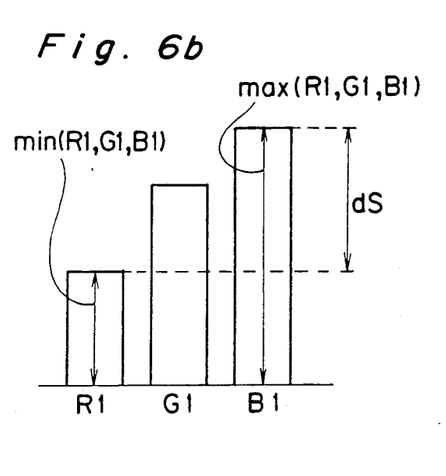

The color judging means (e) is formed by a color judging circuit 10 which judges whether or not the received color pixel data is carrying chromatic or achromatic information. The judging in the color judging circuit 10 is carried out by the calculation of the following equations (5a) and (5b);

$$dS = \max(R1, B1, G1) - \min(R1, B1, G1) \leq L1 \quad (5a)$$

$$dS = \max(R1, B1, G1) - \min(R1, B1, G1) > L1 \quad (5b)$$

in which L1 is a judging level value transmitted on line 36. When it is judged that the equation (5a) is satisfied, meaning that the difference dS between the largest of the three color data R1, B1 and G1 and the smallest of the same is smaller than a predetermined judging level L1, as an example shown in FIG. 6a, it is so judged that the color pixel data R1, B1, G1 is carrying achromatic information. In this case, the color judging circuit 10 produces a HIGH level signal along line 33. On the other hand, when it is judged that the equation (5b) is satisfied, meaning that the difference dS between the largest of the three color data R1, B1 and G1 and the smallest of the same is greater than a predetermined judging level L1, as an example shown in FIG. 6b, it is so judged that the color pixel data R1, B1, G1 is carrying chromatic information. In this case, the color judging circuit 10 produces a LOW level signal along line 33.

In the above described manner, the color judging circuit 10 discriminates whether the each color pixel data is carrying chromatic information or achromatic information based on the judging level value set by the CPU 20, and the judged result is generated on line 33. When the judging level value is set equal to 0, a full black is judged. Instead of setting the judging level to a constant value as in the instant embodiment, the judging level can be varied by the CPU 20 in accordance with the gradiation signal 44. In this case, a look-up table (LUT) is provided in which the table address is made correspondingly to the gradiation signal 44 to provide different judging levels 36. By this arrangement it becomes possible to change the color judging accuracy between the highlight and shadow of the color original document, thus achieving the color judgement adjusted for the characteristic of the input sensor 1. The judging level is a parameter determined through experiments. If the judging level is varied by the CPU 20, the detecting accuracy can be improved. Thus, the operator can set how deep the colored portion in the original document should be deleted. Since the color is detected between chromatic and achromatic, it is not necessary to indicate and set the color to be deleted, reducing the number of manipulations. Moreover, the operator is not required to make a delicate distinction of colors. The detection of the color at the designated position becomes unnecessary, so that the operating convenience and copying speed can be enhanced.

According to the instant embodiment, although the color judging circuit 10 discriminates the color based on the signals R1, B1 and G1, complementary color signals C1, M1 and Y1 may be used for this purpose. In such a case, the color is distinguished, for example, by the following equations (6a) and (6b):

$$dS = \max(C1,M1,Y1) - \min(C1,M1,Y1) \leq L1:$$
(achromatic) (6a)

$$dS = \max(C1,M1,Y1) - \min(C1,M1,Y1) > L1:$$
(chromatic). (6b)

Further provided in the third embodiment shown in FIG. 2 are a microprocessor 20 (hereinafter referred to as a CPU), a memory 21 such as a read only memory (hereinafter referred to as a ROM) or a random access memory (hereinafter referred to as a RAM), an input/output port 24 for outputting a set value from the CPU 20, a bus structure 25 and an interface 26 to the color printer 11.

The deleting area indicating means (f) is formed by an area setting circuit 12 which set a color deleting area by the positional information of the coordinates from a coordinate inputting means 23.

A key panel 22 includes various input keys to start copying, set the number of copy sheets, indicate error, set a copy mode (color copy/monochrome copy), designate the emphasizing color, etc. A display device may be further provided.

The coordinate inputting means 23 is a digitizer. When the operator pushes an area on the original document from where color should be deleted by a position pin, the positional information (address information) of the coordinates of the area in a main scanning direction and in a sub-scanning direction is transmitted to the CPU 20 through the bus 25.

For the color printer 11, for example, a color laser beam printer of the electrophotographic process is used. An image data GZ along line 43 from the deleting circuit 8 is turned into a color image in accordance with the copy mode set via the interface 26 and a control bus 38 from the CPU 20. By way of example, if the color copy mode is set, yellow, magenta, cyan and black images are sequentially formed one over the other on a photosensitive drum using a yellow developing device, a magenta developing device, a cyan developing device and a black developing device. Then, the image is transferred onto a copy paper.

On the other hand, under the monochrome copy mode, specifically, when the black-and-white copy mode is selected, a black image is formed on the photosensitive drum and developed by a black developing device, and transferred onto the paper. The CPU 20 shown in FIG. 2 is programmed to accomplish the setting shown in Table 1.

TABLE 1

| Operation Mode | Block area | Printer Mode | Selector 7 Selection | Delete 8 |
| --- | --- | --- | --- | --- |
| 1st | — | B/W | 44 | ○ |
| 2nd | Outside | Color | 41 | X |
|  | Inside | Color | 44/37 | ○ |
| 3rd | Outside | Color | 41 | X |
|  | Inside | Color | 44/37 | ○ |

The symbol ○ indicates enabled, and X indicates disabled

The operation of the above color deleting apparatus of FIG. 2 will be described.

When the first mode is selected by the set signal 32 from the CPU 20, the printer 11 is set to the black-and-white mode.

In this case, the selector 7 selects only the gradiation signal along line 44 from the monochrome signal generating circuit 9, as shown in FIG. 7a. Therefore, the signal GX from selector 6 will not be used. Also, in this case, the control signal 35 from the area setting circuit 12 is disabled. Thus, the deletion of color is realized by the monochrome copying operation, resulting in the increase of the copying speed.

In FIG. 2, the input sensor 1 outputs analog signals R, G and B of three colors, and the A/D converter 2 changes the analog signals to the 8-bit digital signals R1, G1 and B1 for each pixel. The signals R1, G1 and B1 are applied to gradiation signal generator 9 which then produces a monochrome signal Vd, constituted by black, white and gray signals. The signals R1, G1 and B1 are also applied to color judging circuit 10 which produces a HIGH level signal when the color pixel signal R1, G1 and B1 is carrying achromatic information, and a LOW level signal when the color pixel signal R1 G1 and B1 is carrying chromatic information.

The gradation signal Vd along line 44 is transmitted through selector 7 and is applied to deleting circuit 8 along line 42. The deleting circuit 8 permits the signal along line 42 to pass therethrough when the HIGH level signal is applied thereto from color judging circuit 10. However, the deleting circuit 8 intercepts the signal along line 42 when the LOW level signal is applied thereto from the color judging circuit 10. The signal produced from the delete circuit 8 is applied to a printer 11 which prints the document in black-and-white tone with the color portion completely deleted.

When the second mode is selected and when at least one area is blocked by the area setting circuit 12, the printer 11 is set to the color copy mode and selector 7 selects signal 41(GX) during the printing outside the blocked area, and selects gradation signal 44(Vd) or zero level signal 37 during the printing inside the blocked area.

In FIG. 2, the input sensor 1 outputs analog signals R, G and B of three colors, and the A/D converter 2 changes the analog signals to the 8-bit digital signals R1, G1 and B1. In the color image processing means (b), the color bit signals R1, G1 and B1 are changed to signals C3, M3, Y3 and K2 in the above described manner, and are sequentially produced from selector 6.

During the printing outside the blocked area, the signals C3, M3, Y3 and K2 are sequentially transmitted to the deleting circuit 8 which is now disabled. Thus, regardless of the signal producing from color judging circuit 10, the signals C3, M3, Y3 and K2 are applied to the printer 11 to produce a color image.

During the printing inside the blocked area, the deleting circuit 8 is enabled. Thus, the gradation signal 44(Vd) is transmitted through the deleting circuit 8 when the color judging circuit 10 is producing a HIGH level signal, and the gradation signal 44(Vd) is cut at the deleting circuit 8 when the color judging circuit 10 is producing a LOW level signal. Thus, within the blocked area, only the black and white areas are printed, and the color portions are cut off.

When the third mode is selected and at least one area is blocked by the area setting circuit 12, the printer 11 is set to the color copy mode and selector 7 selects signal 41(GX) during the printing outside the blocked area, and selects signals 44(Vd) and zero level signal 37 during the printing inside the blocked area.

Furthermore, when the third embodiment is selected, an emphasizing color is selected by the key operation in key panel 22. It is now assumed that red is selected as the emphasizing color.

In a similar manner described above, during the printing outside the blocked area, the signals C3, M3, Y3 and K2 are transmitted sequentially to the deleting circuit 8 which is now disabled. Thus, regardless of the signal producing from color judging circuit 10, the signals C3, M3, Y3 and K2 are applied to the printer 11 to produce a color image.

During the printing inside the blocked area, the deleting circuit 8 is enabled. Thus, the gradation signal 44(Vd) and the zero level signal 37 are selected by selector 7 in a certain sequence to reproduce red image, which is obtained by a mixing magenta and yellow images. The signals selected by selector 7 in the above example is shown in Table 2 below.

TABLE 2

| | (Emphasizing color: Red) | | | |
|---|---|---|---|---|
| Printer sequence | Y | M | C | BK |
| Selector 7 selection | 44 | 44 | 37 | 37 |

As understood from Table 2, when the printer 11 is in a cycle for forming an yellow Y image, gradation signal 44 is selected during the printing of the blocked area so that exposure for forming yellow Y image on the drum surface is effected inside the blocked area as well as in the areas outside the block, resulting in a complete yellow Y image.

When the printer 11 is in a cycle for forming a magenta M image, gradation signal 44 is selected during the printing of the blocked area so that the exposure for forming the magenta M image on the drum surface is effected inside the blocked area as well as in the areas outside the block, resulting in a complete magenta M image.

When the printer 11 is in a cycle for forming a cyan C image, zero level signal 37 is selected during the printing of the blocked area so that no exposure on the drum surface is effected inside the blocked area, resulting in an cyan C image with the blocked area blank.

Then, when the printer 11 is in a cycle for forming a black BK image, zero level signal 37 is selected during the printing of the blocked area so that no exposure on the drum surface is effected inside the blocked area, resulting in a black BK image with the blocked area blank.

When the Y, M, C, BK images thus formed are overlapped on the drum surface and reproduced on a copy paper, the image inside the blocked area will be produced as a red image, and, the image outside the blocked areas will be produced as a color image.

As is apparent from the above, the deleting circuit 8 takes, in response to the control signal 34 from the area setting circuit 12, the achromatic area as a valid data only within the designated area when the judging signal on line 33 is HIGH, and deletes the data except the valid data when the judging signal along line 33 is LOW. If the deleting area is not designated, it is possible, needless to say, that the control signal 34 is turned invalid, and the achromatic area is rendered effective in accordance with the judging signal on line 33, so that the data except the valid data is deleted. In such case, the area setting circuit 12 may be omitted.

The area setting circuit 12 is therefore effective only when the deleting area is designated. The area setting circuit 12 outputs the control signals on lines 34 and 35 based on the address information of the coordinate inputting means 23 in accordance with the copy mode set through the operating panel 22. Since it is possible to designate the deleting area, the operator can set the deleting area at a desired position on the original document. The convenience of the color deleting function is much improved.

Although the output from deleting circuit 8 is connected to a color laser beam printer in the above described embodiments, it can be connected to a scanner of a color facsimile or the like via a modem, whereby the transmission time can be reduced if the transmission is made only in the black-and-white image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A color deleting apparatus which comprises:

image reading means for decomposing a color original image into a plurality of colors and for producing color image data for each pixel of said color original image;

monochrome generating means for producing corresponding monochrome image data for each pixel of an output image from said color image data for each pixel of said original image;

image processing means for producing corresponding yellow, magenta, cyan and black data for each pixel of an output image from said color image data for each pixel of said original image;

selecting means for selecting either one of said monochrome image data and said yellow, magenta, cyan and black data;

color judging means for judging for each pixel of said original image whether said color image data is carrying chromatic information or achromatic information;

deleting means for deleting said selected data for each pixel of said output image for which said color judging means judges that the color image data for a corresponding pixel of said original image is carrying chromatic information;

an area setting means for setting a blocked area within said color original image, said deleting means being enabled during image processing inside said blocked area, and said deleting means being disabled during image processing outside said blocked area; and a printer which can selectively be set to either one of a color printing mode and a black-and-white printing mode;

wherein, when said selecting means selects said monochrome image data and said printer is set to said black-and-white printing mode, a black and white image contained in the original image is printed out, and a color image contained in the original image is deleted.

2. A color deleting apparatus which comprises:

image reading means for decomposing a color original image into a plurality of colors and for producing color image data for each pixel of said color original image;

monochrome generating means for producing corresponding monochrome image data for each pixel of an output image from said color image data for each pixel of said original image;

image processing means for producing corresponding yellow, magenta, cyan and black data for each pixel of an output image from said color image data for each pixel of said original image;

selecting means for selecting either one of said monochrome image data and said yellow, magenta, cyan and black data;

color judging means for judging for each pixel of said original image whether said color image data is carrying chromatic information or achromatic information;

deleting means for deleting said selected data for each pixel of said output image for which said color judging means judges that the color image data for a corresponding pixel of said original image is carrying chromatic information;

an area setting means for setting a blocked area within said color original image, said deleting means being enabled during image processing inside said blocked area, and said deleting means being disabled during image processing outside said blocked area; and a printer which can selectively be set to either one of a color printing mode and a black-and-white printing mode;

wherein, when said printer is set to said color printing mode and said selecting means selects said yellow, magenta, cyan and black data during image processing outside said blocked area and selects said monochrome image data during image processing inside said blocked area, a monochrome image contained in the original image is printed inside said blocked area with a color image contained in the original image inside said blocked area being deleted, and a color image contained in the original image outside said blocked area is printed outside said blocked area.

3. A color deleting apparatus as claimed in claim 2, wherein said monochrome image printed inside said blocked area is a black image.

4. A color deleting apparatus as claimed in claim 2, further comprising an emphasize color setting means for setting an emphasize color used inside said blocked area wherein an image corresponding to said monochrome image printed inside said blocked area is printed in said emphasized color.

* * * * *